M. HERING.
LOCKING DEVICE FOR DETACHABLE WHEEL HUBS.
APPLICATION FILED DEC. 27, 1920.
1,394,257.
Patented Oct. 18, 1921.
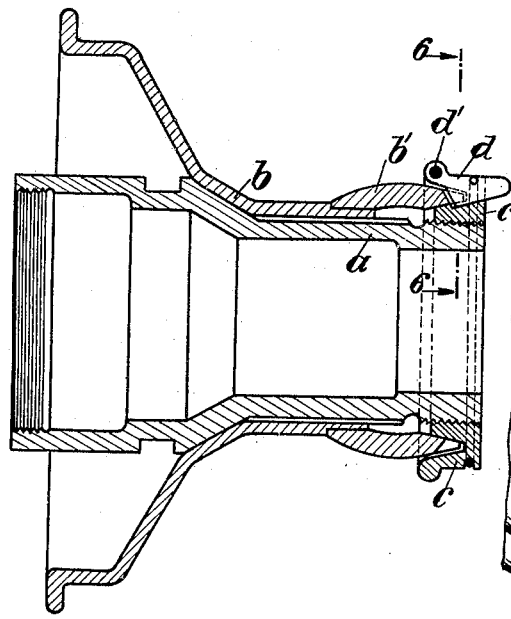
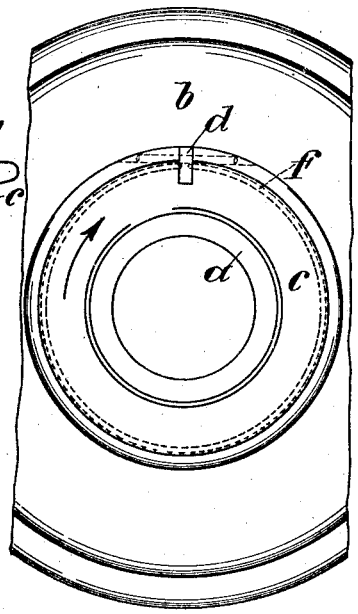
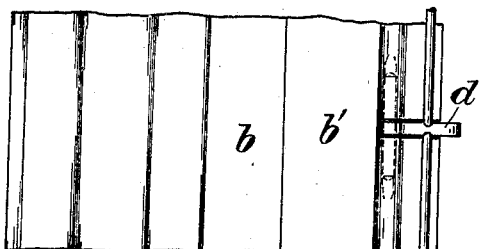
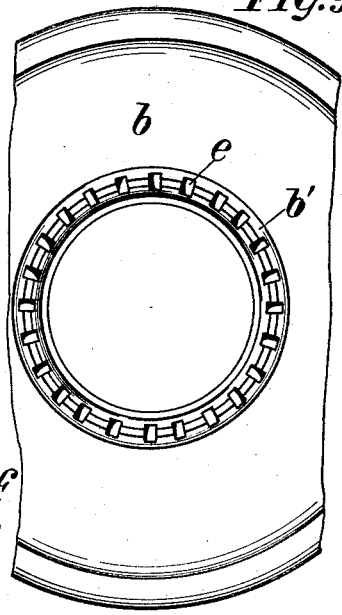
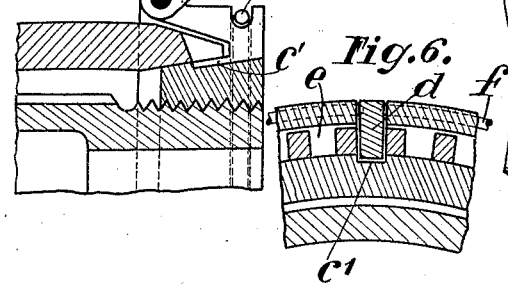
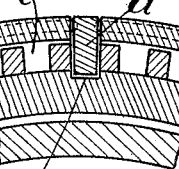
Inventor.

UNITED STATES PATENT OFFICE.

MAX HERING, OF RONNEBURG, GERMANY.

LOCKING DEVICE FOR DETACHABLE-WHEEL HUBS.

1,394,257.     Specification of Letters Patent.     Patented Oct. 18, 1921.

Application filed December 27, 1920. Serial No. 433,543.

*To all whom it may concern:*

Be it known that I, MAX HERING, a citizen of the German Republic, residing at Ronneburg, Saxony-Altenburg, Germany, have invented new and useful Improvements in a Locking Device for Detachable-Wheel Hubs, of which the following is a specification.

My invention relates to locking means for the hubs of detachable wheels, and has for its object to provide certain improvements relating to the constructional shape, arrangement, and coaction of parts whereby the drawbacks hitherto experienced with locking devices of a similar type are obviated, while at the same time the safety character of the locking device is considerably enhanced. And more particularly, my invention relates to a lock nut safety device in which a pawl mounted in the lock nut and elastically secured, engages in a series of covered teeth on the hub to be locked. Lock nuts have been provided, in which pawls acted on by springs engage in a covered series of teeth on the hub. The oscillating movement of these pawls takes place, however, in the direction of the periphery, that is to say in the direction in which the nut is subjected to strain, and as the teeth on the hub are covered, the final locking position cannot be determined prior to the tightening up of the locknut. The proper engagement between the pawl and the teeth on the hub is mostly produced in this arrangement only in the course of running by more or less extensive slackening of the lock nut. Axially oscillating and spring-controlled pawls which engage in teeth recessed radially out of the hub, have also been proposed. In this case the teeth on the hub are compelled to be exposed in order that the engagement thereof with the pawl can be adjusted, beforehand, as the radial recesses, having to bound the ratchet without any clearance worth mentioning, by no means insure the pawl dropping automatically into them after suitably slackening the nut. The exposed teeth on the hub are directly exposed to the action of dirt and after becoming clogged up with dirt completely fail to fulfil their purpose.

According to my present invention both a covered series of teeth on the hub and an axially acting pawl are employed. The disadvantage of the invisibility of the teeth on the hub is at the same time obviated by the fact that the axially mounted pawl can be swung upward to such a height that the teeth on the hub are visible underneath it. In order to impart to the pawl an absolutely secure locking position, it is held in the locking position both on the outer and also on the inner periphery of the teeth on the hub by recesses in the locknut which act in the direction of the periphery as abutments. In order that the pawl, which is swung upward prior to the tightening of the nut shall remain in this position, the safety spring does not act permanently on the pawl but only when this latter is in the locking position. As the elastic safety device an annular spring ring has been found to be suitable to the purpose, this annular spring being placed in a peripheral groove in the locknut.

In order to render my invention quite clear I have illustrated an embodiment of the same, by way of example, in the accompanying drawings in which like characters of reference denote like parts throughout, and in which—

Figure 1 is a transverse section through the hubs of a detachable wheel.

Fig. 2 is a side elevation of Fig. 1.

Fig. 3 is an end view of the external hub with the locknut removed, so that the teeth on the hub which are otherwise closed in, are visible.

Fig. 4 shows a portion of the hub shown in Fig. 1 in plan and

Fig. 5 is a partial transverse section corresponding to Fig. 1, with the pawl swung upward.

Fig. 6 is a section on the line 6—6 of Fig. 1.

On the inner hub $a$ the external hub $b$ is prevented from rotating in the usual way by axially directed teeth. At the outer and the external hub $b$ is extended into a ring $b'$, in the end face of which the teeth gaps $e$ are cut. The annular nut $c$ carries in a beading the pawl $d$ by means of a pivot pin $d'$. The pawl $d$, when in the safety position, engages with its lower boundary edge also in a groove $c'$ in the annular nut $c$ and is therefore held not only on the outer but also in the inner periphery of the teeth $e$ by means of lateral abutments. The pawl $d$ carries on the side faces depressions $d''$, into which the annular spring $f$ drops with the free ends, as soon as the pawl is in the locking position. The annular spring $f$ is located in a peripheral groove in the nut $c$.

Instead of the annular spring $f$ a slide, acted on by the pressure of a spring and running in an annular guide may naturally be used. This slide engages in a hole in the pawl $d$ as soon as this latter is located in the locking position.

In order that the pawl $d$ shall remain in the swung position, and thus allow of the inspection of the teeth on the hub when the nut is being tightened up, it is essential that the spring shall not act permanently on the pawl, as was the case in all similar locknut safety devices as hitherto constructed.

What I claim and desire to secure by Letters Patent of the United States, is:—

1. Locking means for the hubs of detachable wheels, comprising in combination, a permanent hub, a locking nut screw-threaded on said permanent hub, a detachable hub adapted to be engaged by said locking nut, a series of axially cut teeth on that part of said detachable hub which is adapted to be engaged by said nut, a pawl pivotally mounted in said locking nut in axial direction and so as to be able to engage said teeth in said detachable hub, said pawl protruding from said nut so as to be taken hold of by hand for the purpose of being disengaged from said teeth by swinging said pawl axially upward, and resilient means mounted in said nut and adapted to act upon said pawl in the locking position only, whereby said pawl is enabled to remain stationary in the swung up position while the same is out of engagement with said teeth on said hub so that then said nut can be tightened up and adjusted.

2. Locking means for the hubs of detachable wheels, comprising, in combination, a permanent hub, a detachable hub, a locking nut screw-threaded on said permanent hub and adapted to engage said detachable hub, a series of axially cut teeth on that part of said detachable hub which is engaged by said nut, a ring-like structure on said nut and adapted to cover the toothed part of said detachable hub, a pawl pivotally mounted in said ring-like structure of said locking nut and so as to be able to engage said teeth in said detachable hub by a swinging movement in axial direction, said pawl protruding from said nut so as to be taken hold of by hand for the purpose of being disengaged from said teeth by swinging said pawl axially upward, and resilient means, mounted in said nut and adapted to act upon said pawl in the locking position only, whereby said pawl is enabled to remain stationary in the swung up position while the same is out of engagement with said teeth on said hub so that then said nut can be tightened up and adjusted.

3. Locking means for the hubs of detachable wheels, comprising, in combination a permanent hub, a detachable hub, a locking nut screw-threaded on said permanent hub and adapted to engage said detachable hub with a conical bearing face, a series of axially cut teeth on that part of said detachable hub which is engaged by said nut, a ring-like structure integral with said nut and adapted to cover the toothed part of said detachable hub, an axially directed rectangular recess in said structure and extending radially into said nut so as to cross said conical bearing face, a pawl pivotally mounted in said recess, said pawl being of such a structure as to engage said teeth in said detachable hub and extend across said conical bearing face of said nut, said pawl protruding from said nut so as to be taken hold of by hand for the purpose of being disengaged from said teeth by swinging said pawl axially upward, and resilient means, mounted in said nut and adapted to act upon said pawl in the locking position only, whereby said pawl is enabled to remain stationary in the swung up position while being out of engagement with said teeth on said hub so that then said nut can be tightened up.

MAX HERING.